Sept. 20, 1932.　　　　　J. BOSSART　　　　　1,877,796

HYDRAULIC TORQUE CONVERTER

Filed Jan. 27, 1932　　　2 Sheets-Sheet 1

INVENTOR.
John Bossart
BY Robt. W. Pearson
ATTORNEYS.

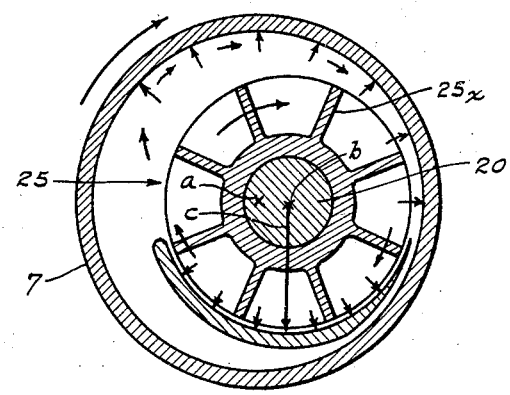
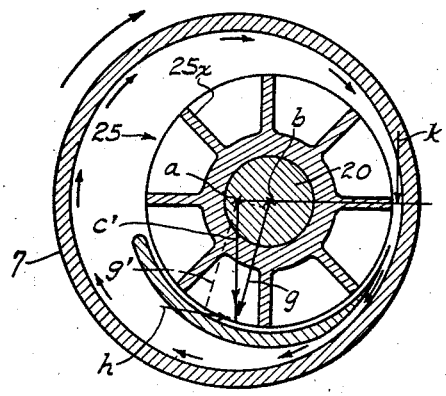

Patented Sept. 20, 1932

1,877,796

UNITED STATES PATENT OFFICE

JOHN BOSSART, OF LOS ANGELES, CALIFORNIA

HYDRAULIC TORQUE CONVERTER

Application filed January 27, 1932. Serial No. 589,207.

This invenion relates to a torque converter of the hydraulic type.

An object of the invention is to provide means to keep a liquid substance in motion along a substantially circular path and means to utilize the centrifugal forces produced by the said moving liquid and to convert them into torque or into speed and torque or to employ them as a means to produce a continuous resistance against a rotating body.

The torque converter provided by this invention can be used as a speed reducer capable of transforming a given torque at a certain speed into a torque of greater force at a slower speed without waste of power, and can be used as a brake or a device in which a rotating body is forced to act against a continuous resistance. This torque converter is capable of performing the duties of either of the aforesaid applications without generating excessive heat as the liquid travels at a substantially even speed along a curved path with a small amount of friction.

The torque converter provided by this invention is of an exceedingly simple, compact construction; is made up of a few simple parts which can be manufactured at a relatively low cost and which can be conveniently assembled and disassembled. There are no delicate parts liable to be accidentally broken and the device is therefore adapted for rough usage in doing heavy work over a long period of time and without the necessity of repair or replacement of worn parts.

Other objects, advantages and features of the invention may hereinafter appear.

Referring to the accompanying drawings which illustrate what is at present deemed to be a preferred embodiment of the invention, Fig. 1 is a cross section of the complete device taken on line 1—1 of Fig. 2.

Figs. 2 and 3 are on a smaller scale than Fig. 1.

Fig. 4 is a somewhat diagrammatic view illustrating the action of the fluid when the driving unit is rotating and producing a torque in the stationary driven unit.

Fig. 5 is a somewhat diagrammatic view illustrating the liquid movement within the device when the driven unit is rotating at approximately the same speed as the driving unit.

Figure 1:
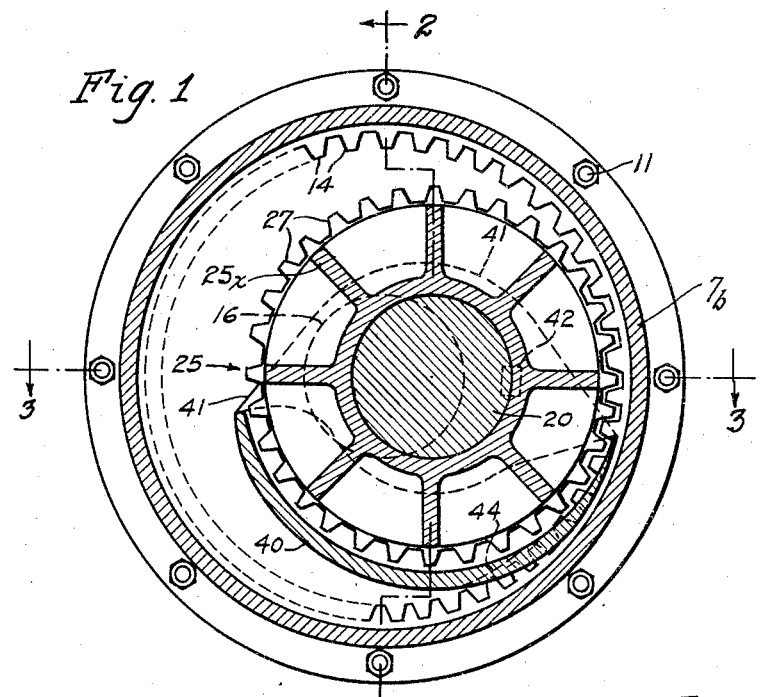

Referring in detail to the drawings, the cylindrical casing 7 is preferably formed in two halves 7a and 7b with the half 7a provided around its inner end with the peripheral external flange 8 and the casing section 7b provided with a like peripheral flange 9 which cooperates with said flange 8. Between said flanges 8 and 9 is interposed a ring gear 10 through which extends a series of bolts 11 whereby the flanges 8 and 9 are clamped securely to opposite sides of said ring 10. Within the casing said ring gear is provided with gear teeth 14 for the purpose later specified.

Within the casing 7 is a substantially cylindrical fluid tight chamber 15. An axial driving shaft 16 joins one end of the casing 7 in fixed relation thereto to rotate therewith, and through the opposite end wall of said casing concentric therewith, extends the axial driven shaft 17, there being a fluid tight fit between said shaft 17 and the end wall of the casing which is at this point preferably provided with the bearing flange 18. Within the chamber 15 is an internal shaft 20, said shaft being at one end in fixed relation to the shaft 17, by preference and as shown being formed integral with said shaft 17. At its other end the shaft 20 is provided with a bearing extension 22 which is concentric with the axial shaft 16. By the construction which has just been described the internal shaft 20 is at all times maintained in an eccentric relation to the cylindrical chamber 15, said shaft 20 rotating with the shaft 17 in a gyratory manner during the operation of the device.

Upon said internal shaft 20 is mounted a paddle wheel 25, said paddle wheel being smaller in diameter than chamber 15 and having a working fit upon said shaft 20. This paddle wheel has radially extending blades or paddles 25x and is provided at approximately its mid-length with a gear flange 26 having teeth 27 which mesh with the internal teeth 14 of the ring 10. At each side of its toothed flange 26, the paddle wheel is symmetrically constructed, being provided with the two series of paddle blades 25x which are located between the inner flanges 29 and the outer flanges 30. Said paddle wheel has a hub portion or sleeve 35 which has a working fit upon the internal shaft 20. A segmental liquid deflector 40 is provided at each end with a bearing or hanger flange 41, said bearing flange being provided with openings whereby said deflector is mounted upon the end portions of the shaft 20, keys 42 being provided to secure said flanges 41 to the shaft 20. The hanger flanges 41 of the deflector are desirably provided on their outer faces with annular bearing shoulders 41s which reduce the frictional engagement of said flanges 41 with the parts wherewith they contact.

The inner face of the deflector 40 is preferably provided near its mid-length with transversely extending spaced reinforcing flanges 43. Reinforcement of the deflector at this point is desirable because it is necessary to cut a slot 44 into the deflector at the edge thereof which at all times lies adjacent to the wall of the chamber 15. This portion of the deflector is preferably tapered or thinned so that it terminates in a rather sharp edge as shown in Fig. 1.

Figure 2:
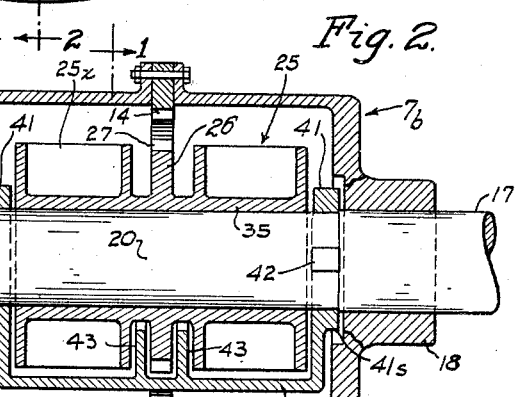
Fig. 2 is a longitudinal section on irregular line 2—2 of Fig. 1.

Any suitable means may be provided to supply liquid to the interior of the casing, such liquid preferably being a heavy oil and being supplied in sufficient quantity to approximately fill the interior of the casing to one-third of its capacity. For this purpose an inlet opening 50 is shown in Fig. 2, said opening being closed by a check valve 51.

The deflector plate 40, as well shown in Fig. 1, is mounted in an eccentric manner with relation to the shaft 20 in order that the action of the liquid upon the inner face of said deflector plate, as will hereinafter be explained, will tend to rotate said shaft 20.

The complete housing with the internal ring gear 10, the paddle wheel 25 with its spur gear and the liquid contained within the housing (preferably filling about one-third the space therewithin) constitute the driving unit. The driven shaft 17 with the eccentric shaft 20 and the deflector attached thereto constitute the driven unit.

Whether this torque converter functions as a speed reducer or as a brake, the driving unit always rotates. Referring to Fig. 1, the rotation is always in a clockwise direction. A source of power rotates the housing which in turn rotates the paddle wheel, both rotating in the same direction and at substantially the same peripheral velocity. The rotation of the housing and the paddle wheel causes the liquid to distribute itself over the inner surface of the housing and to move in the same direction and at the same speed as the aforesaid two members, as indicated by the arrows in Fig. 5.

It will be seen that the deflector 40 overlies a segment of the paddle wheel 25 and that said deflector extends substantially the full width of said wheel with its concave face adjacent thereto. During the operation of the device this concavo-convex deflector remains with its right hand tapered edge, as viewed in Fig. 1, adjacent to the portion of the casing wall which is nearest to the paddle wheel 25.

If this torque converter functions as a speed reducer, called upon to accelerate the driven shaft from a stand-still, then the action is as follows: The driving unit rotates in a clockwise direction as seen in Fig. 4 and the liquid moves with it in the same direction as indicated by the small arrows in said view, the liquid being actuated by frictional traction on the inner wall of the housing and by the paddles of the rotating paddle wheel. The moving liquid is picked up by the deflector on one side of the housing and is guided over its inner surface to the opposite side of the housing, from which point it is carried along by the rotating housing for a repetition of the operation. The centrifugal forces produced by this moving liquid while passing over the concave surface of the deflector produce a pressure against the deflector, which, being eccentrically fastened to the driven shaft, generates a torque and eventually a rotating movement in the driven shafts 20 and 17 in the same direction as the driving unit. The movement of the driven unit accelerates until the forces opposing its rotation are equal to the torque produced by the moving liquid of the driving unit, from then on the driven unit continues to rotate at an even speed. Eventually the speed of the driven unit may reach a speed equal to the speed of the driving unit.

Figure 3:
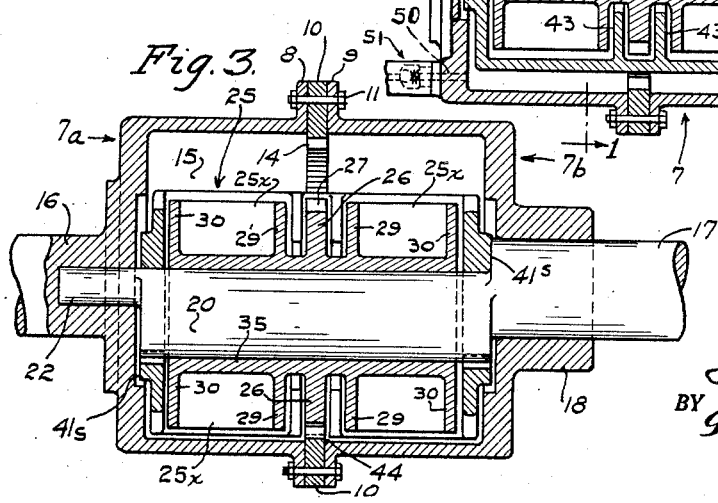
Fig. 3 is a transverse section on line 3—3 of Fig. 1.

The torque exerted by the fast rotating driving unit is small in comparison to the torque produced in the stationary or slowly moving driven unit, a fact explained as follows: The liquid moves in an oval path at substantially the same velocity as the cylindrical body of the housing. Power is consumed by the driving unit in its effort to deflect and move the liquid over the deflector, which power consists mainly in frictional resistance of the liquid against the deflector. An additional amount of power is expended by the driving unit in changing the direction of flow of the liquid when it strikes the wall of the housing after leaving the deflector. The liquid moving in an oval path produces centrifugal forces against the cylindrical body of the housing and also against the deflector, said centrifugal forces being represented by the small radial arrows shown in Fig. 4. The centrifugal forces acting against the cylindrical body of the housing produce strains in the material of the housing but they do not produce or oppose any torque in the driving unit. The sum of all the centrifugal forces acting against the deflector is represented by the arrow $c$ in Fig. 4. This said resultant force $c$ passes through the point $b$ which is the center of the curved deflector body and as this point $b$ is eccentrically located with relation to the driven shaft 17 (see Fig. 3) a torque is produced in said driven shaft. As the centrifugal forces increase in the same ratio as the square of the velocity of the moving liquid, the torque produced in the driven unit also increases in the same said proportions. The power consumption of the driving unit, consisting in keeping the liquid in motion, however, increases only in the same ratio as the velocity of the liquid. Therefore, assuming that the driving unit rotates at a certain number of revolutions per minute and that a certain amount of torque is exerted against the stationary driven unit, then, doubling the speed of the driving unit doubles its power consumption, but the torque produced in the driven unit is multiplied by four.

Should an outside force act upon the driven unit tending to rotate said driven unit in a direction opposite to the rotation of the driving unit, then the action of the rotating driving unit, as described in the previous paragraph, would act as a continuous resistance against the rotation of the driven unit and in this case the torque converter would function as a brake.

The working principle of the torque converter when the driven unit rotates at approximately the same speed as the driving unit, is illustrated in Fig. 5 and is as follows: In this case the entire torque converter including the liquid rotates around the center axis $a$ at substantially the same speed and in the same (clockwise) direction. A certain amount of liquid distributes itself along the inner surface of the housing and adheres thereto by reason of centrifugal force. A certain amount of the liquid is trapped on the concave surface of the deflector and held in that position by the paddles of the paddle wheel. As the whole torque converter revolves around the center axis $a$, every particle of the liquid produces a centrifugal force radially outwards from the center axis $a$. The centrifugal forces acting against the housing directly produce neither torque nor resistance. The centrifugal forces of the liquid trapped on the deflector act as follows, and for convenience, only one paddle space is taken into consideration, there being the same principle of action in all those in contact with the deflector:

The centrifugal force, acting as indicated by the arrow $c'$, being a radial force from axis $a$ is dissolved into the two components marked $g$ and $h$. The force $g$ acts against the deflector and produces the torque in the driven shaft derived from that particular force $c'$. The force $h$ acts against a paddle of the paddle wheel which in turn transmits this force $h$ into the housing by means of the gears. The force $k$ represents the power or torque introduced into the driving unit from some outside source, opposing the force $h$ through the gears and the paddle wheel. As every volume of liquid trapped on the deflector by a paddle of the paddle wheel acts in the same manner as above described, the total torque expended by the driving unit is represented by the sum of all forces $h$ or $k$, and the total torque put into the driven unit is represented by the sum of all forces $g$. Leakage of liquid past the paddle on contact with the deflector produces a certain amount of slippage, preventing the driven unit from rotating at a speed completely equal to the driving unit.

Should outside forces act upon the driven unit in the same direction of rotation as the driving unit then the driven unit is free to rotate at a faster speed than the driving unit in which case this torque converter acts as an overrunning clutch or as a free wheeling device.

I claim:

1. In a device of the kind described, a casing having a substantially cylindrical chamber therein, an axial shaft joining one end of said casing in fixed relation thereto to rotate therewith, an axial shaft projecting through the opposite end wall of said casing concentric therewith, the first named shaft being a driving element and the other a driven element, there being a fluid tight fit between the last named shaft and the end wall of the casing, an internal eccentric shaft within said casing, said internal shaft being at one end in fixed relation to the last recited axial shaft to rotate therewith in a gyratory manner and being at its other end provided with a bearing which is concentric with the first recited axial shaft, a paddle wheel mounted upon said eccentric shaft to rotate independently thereof, said paddle wheel being of less diameter than said chamber and there being a toothed relation between said wheel and the wall of said casing to cause the rotation of said casing to rotate said wheel, and a segmental liquid deflector secured in an offset manner to said eccentric shaft to receive liquid thrown against said deflector by the rotation of the said casing and of said paddle wheel, thereby to cause a relative rotation between the driving and driven elements of the device.

2. In a device of the kind described, a casing having a substantially cylindrical chamber therein and a bearing opening in one end thereof, an external shaft having an end portion which has a working fit within said bearing opening, an internal shaft eccentrically united to said external shaft at one end, the other end of said internal shaft having a bearing extension rotatably engaging the opposite end portion of the casing, said bearing extension being in axial alinement with said external shaft, a liquid propulsion wheel mounted loosely upon said internal shaft, said wheel being thereby maintained with one side of its periphery adjacent to the wall of said chamber while a relatively large clearance is maintained between the opposite side of said wheel and said chamber, a deflector member in fixed relation to said internal shaft and fixed to said shaft in an offset manner, means to rotate said casing, and means whereby the rotation of said casing causes said wheel to rotate and thereby direct liquid over said deflector thus transferring rotary movement to said external shaft.

3. In a device of the kind described, a casing having a substantially cylindrical chamber therein, an axial shaft joining one end of said casing in fixed relation thereto concentric therewith and to rotate therewith, an axial shaft projecting through the opposite end wall of said casing concentric therewith, the first named shaft being a driving element and the other a driven element, an internal shaft within said casing, said internal shaft being at one end integral with the driven shaft and offset laterally therefrom to rotate therewith in a gyratory manner, the other end of said internal shaft being provided with a bearing to support said internal shaft as a whole in an eccentric manner within said chamber, a wheel mounted with a working fit upon said eccentric shaft, said wheel having a series of paddle blades adapted to cause a movement of liquid within the chamber, said wheel being of less diameter than said chamber and mounted to gyrate therein upon said eccentric shaft in such a manner that the periphery thereof is always adjacent to one side of said chamber while there is considerable clearance between the other side of said chamber and said wheel, there being a set of gear teeth extending around the periphery of said wheel and a set of internal gear teeth within said chamber meshing with the teeth of the wheel, and a liquid deflector secured to said internal shaft in an offset manner whereby liquid thrown thereagainst by said wheel causes said internal shaft to gyrate and thereby rotates said driven shaft.

4. In a device of the kind described, a casing having a substantially cylindrical chamber therein, means to support said casing, means to rotate said casing around its center axis, a bearing opening through one end wall of said casing, an external shaft concentric with the axis of rotation of the said casing passing through said bearing opening, an internal shaft within said chamber parallel with but eccentrically located in relation to the axis of rotation of said casing, said internal shaft being at one end in fixed relation to said external shaft to move therewith, a wheel with paddle blades within said chamber mounted loosely upon said internal shaft, a deflector body overlying a segment of said wheel, and said deflector having a concave face which is adjacent to the periphery of said wheel, said deflector being eccentrically fixed to said eccentric shaft in such a manner that force directed against its concave face will tend to rotate said eccentric shaft.

5. In a device of the kind described, a casing having a substantially cylindrical chamber therein, means to support the casing, means to rotate said casing around its center axis, a bearing opening through one end wall of said casing, an external shaft concentric with the axis of rotation of said casing passing through said bearing opening, an internal shaft within said chamber parallel with but eccentrically located in relation to the axis of rotation of said casing, said internal shaft being at one end in fixed relation to said external shaft to move therewith, a wheel with paddle blades within said chamber mounted loosely upon said internal shaft, a deflector body overlying a segment of said wheel substantially in its full width and extending substantially from the line where said wheel is closest to the cylindrical wall of said casing to the line where said wheel is farthest from said wall, said deflector body being in fixed relation to said internal shaft, means to transmit rotary motion from said casing to said wheel, the rotary motion of the last recited two members causing a liquid contained in said casing to flow over the concave surface of said deflector body, the centrifugal forces generated by said moving liquid producing a pressure against the said deflector body thus transferring the rotary motion of said casing to said external shaft.

In testimony whereof, I hereunto affix my signature.

JOHN BOSSART.